United States Patent
Shaliv et al.

(10) Patent No.: US 8,862,882 B2
(45) Date of Patent: Oct. 14, 2014

(54) SYSTEMS AND METHODS FOR AUTHENTICATING DEVICES BY ADDING SECURE FEATURES TO WI-FI TAGS

(75) Inventors: Adi Shaliv, Nir-Banim (IL); David Birnbaum, Modiin (IL)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 13/537,523

(22) Filed: Jun. 29, 2012

(65) Prior Publication Data

US 2014/0006785 A1    Jan. 2, 2014

(51) Int. Cl.
*H04L 9/32*     (2006.01)
*H04L 9/08*     (2006.01)
*H04N 1/00*     (2006.01)

(52) U.S. Cl.
CPC *H04L 9/32* (2013.01); *H04L 9/088* (2013.01); *H04N 1/00055* (2013.01)
USPC .................. 713/170; 713/176; 726/5; 726/18

(58) Field of Classification Search
CPC ......... H04L 9/32; H04L 9/088; H04N 1/0005
USPC ................................. 713/170, 176; 726/5, 18
See application file for complete search history.

(56) References Cited

U.S. PATENT DOCUMENTS

| | | | | |
|---|---|---|---|---|
| 4,866,707 A | * | 9/1989 | Marshall et al. | 714/749 |
| 2006/0040656 A1 | * | 2/2006 | Kotzin | 455/426.2 |
| 2008/0123850 A1 | * | 5/2008 | Bhatnagar et al. | 380/259 |
| 2008/0175386 A1 | * | 7/2008 | Bestermann | 380/270 |
| 2008/0263224 A1 | * | 10/2008 | Gilhuly et al. | 709/242 |
| 2009/0305673 A1 | * | 12/2009 | Mardikar | 455/411 |
| 2010/0169446 A1 | * | 7/2010 | Linden et al. | 709/206 |
| 2011/0231652 A1 | * | 9/2011 | Bollay et al. | 713/153 |
| 2011/0238780 A1 | * | 9/2011 | Neitzel et al. | 709/217 |
| 2011/0271104 A9 | * | 11/2011 | Sandler et al. | 713/168 |
| 2011/0302408 A1 | * | 12/2011 | McDermott et al. | 713/153 |
| 2011/0320552 A1 | * | 12/2011 | Friedman et al. | 709/206 |
| 2012/0023571 A1 | * | 1/2012 | Spies et al. | 726/12 |
| 2012/0036361 A1 | * | 2/2012 | Tyhurst et al. | 713/168 |
| 2012/0047215 A1 | * | 2/2012 | Asthana et al. | 709/206 |
| 2012/0149339 A1 | * | 6/2012 | Mulampaka et al. | 455/412.1 |
| 2012/0213365 A1 | * | 8/2012 | Brown et al. | 380/270 |
| 2012/0214441 A1 | * | 8/2012 | Raleigh | 455/406 |
| 2012/0284193 A1 | * | 11/2012 | Bharghavan et al. | 705/64 |
| 2013/0177156 A1 | * | 7/2013 | Ryan | 380/277 |
| 2013/0311769 A1 | * | 11/2013 | Hayes | 713/155 |
| 2013/0339736 A1 | * | 12/2013 | Nayshtut et al. | 713/170 |

\* cited by examiner

*Primary Examiner* — O. C. Vostal (74) *Attorney, Agent, or Firm* — Sutherland Asbill & Brennan LLP (57) ABSTRACT

Systems and methods are described herein for authenticating a user device that uses a wireless local area network. The user device may generate an encrypted authentication block and/or digitally signed block that includes a variety of information associated with the user device. The user device may attach the encrypted authentication block to periodic messages that are being monitored by the network. The messages may include an unencrypted portion in addition to the encrypted authentication block. A network server may extract the authentication block and decrypt the user device information to verify the identity or the digital signature of the user device. If the network server verifies the identity of the user device, the network server may continue to communicate and provide services with the user device. If the user device identity is not verified, the network server may cease communicating with or providing the user device.

29 Claims, 6 Drawing Sheets

SYSTEMS AND METHODS FOR AUTHENTICATING DEVICES BY ADDING SECURE FEATURES TO WI-FI TAGS

TECHNICAL FIELD

This disclosure generally relates to systems and methods for authenticating the identity of a user device by adding secure portions to unsecured messages being sent to a server over wireless network.

BACKGROUND

Maintaining network security is an important part of operating any network and becomes very complicated as the size of the network increases. As the network size increases the number of opportunities to compromise the network also increases and may likely to become a target for unauthorized access due to networks size. Network administrators have developed a variety of policies and procedures to prevent unauthorized network access. For example, in the wireless network space, the network administrators may use one or more access points to determine the location of the user devices accessing the access points. A network server may monitor the signal strength or other characteristics of the signal received by the access points to determine the location of the user device. The network administrator may enforce a policy which dictates that the user device be at or near a recognized location to receive network access. Although such policies are effective, they are subject to new countermeasures that seek to circumvent the policies and gain access to the network. Hence, new techniques to address gaps in network security are desirable.

BRIEF DESCRIPTION OF THE FIGURES

The features within the drawings are numbered and are cross-referenced with the written description. Generally, the first numeral reflects the drawing number where the feature was first introduced, and the remaining numerals are intended to distinguish the feature from the other notated features within that drawing. However, if a feature is used across several drawings, the number used to identify the feature in the drawing where the feature first appeared will be used. Reference will now be made to the accompanying drawings, which are not necessarily drawn to scale and wherein.

DETAILED DESCRIPTION OF EMBODIMENTS OF THE INVENTION

Embodiments of the invention are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Embodiments described in this disclosure may provide systems, methods, and devices for authenticating a user device to use a network and/or the services on the network. At a high level, a network administrator may implement security protocols to maintain network security for a large and geographically diverse network that may include tens, hundreds, or thousands of devices. In one instance, the network may include wireless networks comprised of access points that provide a wireless connection to the network for user devices and facilitate communication with other devices on the network.

Security protocols for the network may be based on the location of the user device and the network may determine the location of the user device based on the signals received by the access points. These signals may include periodic or recurring messages that are used to comply with network protocols and are sent by most of the devices on the network on a frequent basis. However, an unauthorized user may replicate or spoof the periodic messages when they are in range of the access points. One way to prevent this type of unauthorized access may be to add in an encrypted and digitally signed identification portion to the periodic messages.

In one instance, the user device may generate an encryption key and signing keys and provide a copy to a server on the network via a secure session. The security protocols may designate one or more periodic messages to include an encrypted and digitally signed portion generated via the encryption key. The encrypted portion may include an identifier for the user device that is not publically or easily available to those outside the network. In another instance, the encrypted portion may include other information associated with the user device that is not easily known. This may include a time stamp of when the encrypted portion was created or a time stamp for any other operation that was performed by the user device. The time stamp may also include an anti-replay counter that will increase when the encrypted portion is updated. Additionally, the location of the user device may also be included in the encrypted portion. The location may be determined by geographical positioning device associated with the user device or a location provided to the user device from the location server.

When the location server receives the periodic message, the encrypted portion of the message may be extracted and decrypted. The digital signature may also be verified. The location server may verify the decrypted information is consistent with the information (e.g., identifier, time stamp, location) stored on the location server. If the decrypted information is authenticated, the network may acknowledge the authentication by continuing to interact with the user device in a normal manner. If the decrypted information is not authenticated, the network or services on the network may discontinue interacting with the network device.

Example embodiments of the invention will now be described with reference to the accompanying figures.

Figure 1:
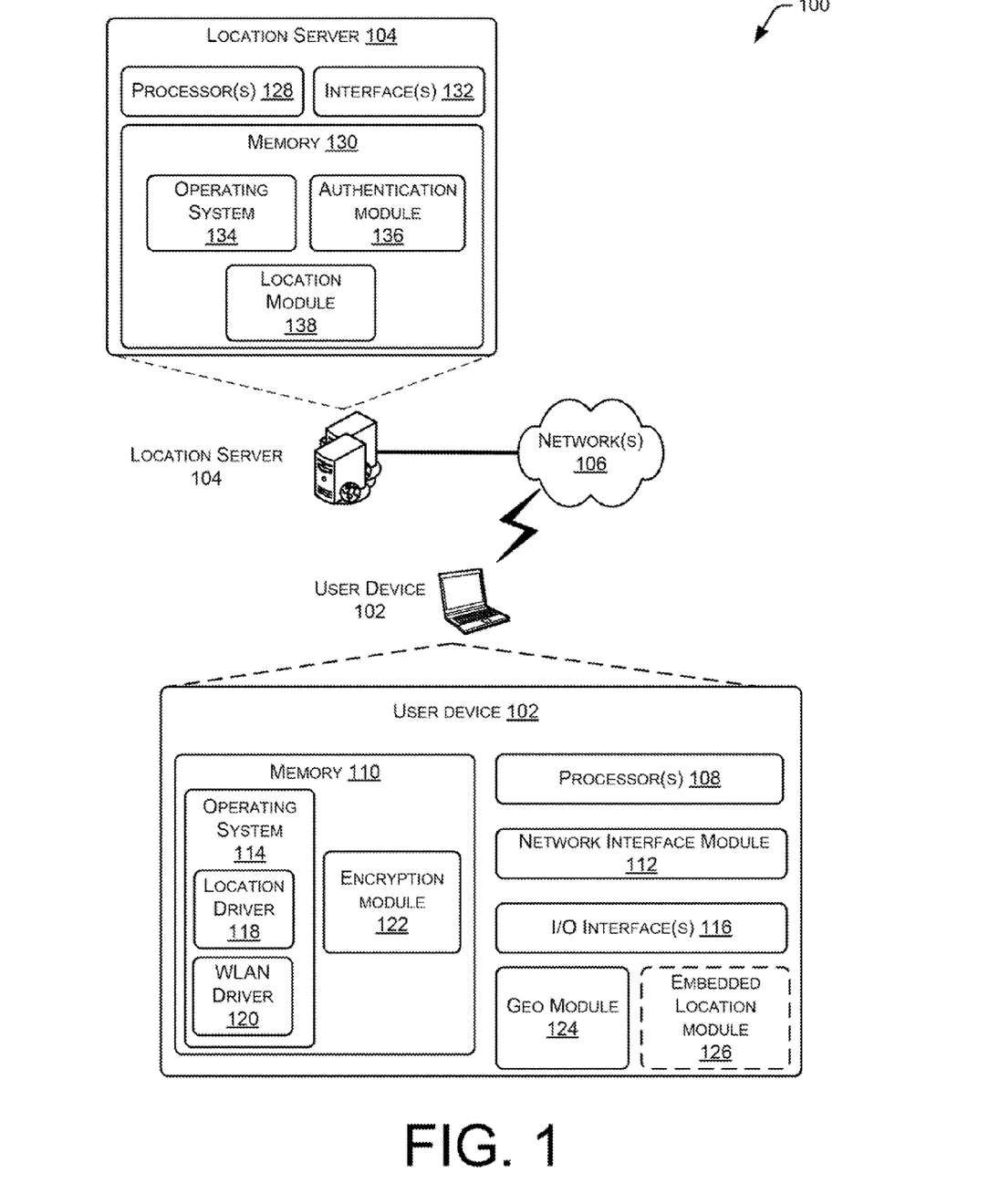
FIG. 1 is a block diagram of a representative environment of a wireless network including a user device and a location server that authenticates the identity of the user device in accordance with one or more embodiments of the disclosure.

FIG. 1 is a simplified block diagram of a representative environment 100 that includes a user device 102 and location server 104 in electrical communication over a wireless network 106. At a high level, the user device 102 and the location server 104 may interact with each other to authenticate the identity of the user device 102. The authentication systems and techniques will be introduced by the description of the individual devices with regard to FIG. 1.

In one embodiment, the user device 102 may include a computer processor 108 to execute computer-readable instructions stored in memory 110 that enable the device to execute instructions on the hardware, applications, or services associated with the user device 102. The one or more computer processors 108 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 108 and one or more of the other components of the user device 102. In certain embodiments, the user device 102 may be based on an Intel® Architecture system and the processor(s) 108 and chipset may be from a family of Intel® processors and chipsets, such as the Intel® Atom® processor family. The one or more processors 108 may also include one or more application-specific integrated circuits (ASICs) or application-specific standard products (ASSPs) for handling specific data processing functions or tasks.

Memory 110 may include an operating system 114 to manage and execute applications stored therein as well as other systems and modules within the user device 102. For example, the user device 102 may include an Input/Output (I/O) interface 116 that enables a user to view content displayed by the device or to interact with the user device 102 using various tactile responsive interfaces such as a keyboard, touch screen, or mouse. The operating system 114 may also include a location driver 118 and a Wireless Local Area Network (WLAN) driver.

The location driver 118 may be configured to manage an authentication process to comply with network security protocols from the point of view of the user device 102. In one embodiment, the authentication process may broadly include an encryption portion, a communication portion, a verification portion, and an acknowledgement portion. The location driver 118 may play a role in the encryption, communication, and acknowledgement portions.

The location driver 118 may generate or direct the encryption module 122 to generate an encryption key that may be shared with the location server via a secure session. The type of encryption will be discussed in greater detail in the description of the encryption module 122. Then encryption key may be used to encrypt certain types of information that may be closely held by the network and not readily available or accessible to users outside the network. For example, the network administrators may assign a unique identifier to the user device that may not be related to typical identifying information that is readily exchanged or referenced in network communications. The identifier may or may not include typical identifying information such as an Internet Protocol (IP) address or a Media Access Control (MAC) address. However, the identifier may be composed of any numeric, alphanumeric, or data string that may be read by a computing device. When the identifier is encrypted, it may be referred to as the identification block. In another embodiment, one or more other bits of information may also be encrypted and included in the identification block to increase the complexity and make it more difficult to replicate or spoof the identification block. For example, one type of other information may include a time stamp associated with the creation of the identification block or a time stamp for any other operations performed by the user device. This may include a time stamp of when the encryption key was sent or any other operation that may tracked or identified by the user device 102 and the location server 104. For example, the other information may be provided to the location server 104 and may be stored in memory and referenced when each new identification block is received from the user device 104. The location server 104 may determine if the other information is consistent with the stored information or if the other information has been updated in a way that is consistent with the previous information. For example, the location server 104 may determine that the time stamp has been incremented in predictable way, such that the new time stamp happened after the previous time stamp.

With regard to the communication portion of the authentication process, the location driver 118 may also select which periodic messages may be appended with the identification block. The periodic message may be consistently chosen as a carrier of the identification block or the location driver 118 may randomize between different periodic messages in a manner that may be known to the location server 104. The randomization adds another level of complexity that may make it harder to replicate or spoof the authentication process. Therefore, the periodic message may include an encrypted portion and an unencrypted portion. The location server 104 may extract the encrypted portion, decrypt, and analyze the identification block. If the identification block is successfully authenticated the location server 104 may provide an acknowledgment to the user device 102. In one embodiment, the acknowledgement may be an acknowledgement message or the mere continuation of communication or network services with the user device 102 may also be an acknowledgement of the authentication. For example, if the identification block is not authenticated the network may stop communicating with the user device 102 or providing services to the user device 102.

The WLAN driver 120 may be configured to control or direct the network interface module 112 to communicate with other devices over the network 106. This may include generating messages that are compliant with network protocols to exchange information efficiently and effectively per the Wi-Fi Direct Standard (See; Wi-Fi Direct specification published in October 2010) and/or the IEEE 802.11 wireless standard (See; IEEE 802.11-2007, published Mar. 8, 2007; IEEE 802.11n-2009, published October 2009) or a combination thereof. The standards may require that specific types of message may be sent on a periodic or intermittent basis in order to comply with the standard. The WLAN driver 120 may manage and monitor this message traffic. Additionally, the location driver 118 may instruct the WLAN driver 120 to append, insert, or add the identification block to one or more of these periodic messages that is being sent to or directed to the location server 104 via the network interface module 112. Additionally, the location driver 118 may also request that the WLAN driver 120 initiate a secure session with the location server 104 to provide the encryption key. Although the location driver 118 and the WLAN driver 120 are shown as separate modules, in another embodiment, the location driver 118 may be incorporated into the WLAN driver 120.

The memory 110 may also include an encryption module 122 that may on its own or in conjunction with the location driver 118 to encrypt or digitally sign information that may be included in the identification block. In one embodiment, the encryption techniques may follow a digital signature scheme that includes a public key associated with a plurality of private keys. In this way, each private key can generate a signature that can be verified using the group public key. Accordingly, a private key holder may not need to know each private key by using the general public key to do the decryption. Hence, the private key holders may remain anonymous. However, in other embodiments, any other type of encryption may be applicable to encrypt or decrypt the identification block.

The memory 110 may be comprised of one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof.

The network interface module 112 may include a wireless system 122 that may enable the user device 102 to communicate wirelessly with the other devices over the network 106. The wireless system 122 may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system 122 may include a transmitter and a receiver or a transceiver (not shown) capable of operating in a broad range of operating frequencies governed by the 802.11 wireless standard.

The user device 102 may also include a geo module 124 that may determine the geographical or physical location of the user device 102. The geo module 124 may use satellite global positioning techniques or terrestrial radio positioning techniques to determine the location of the user device 102. The geo module 124 may provide the location information to the location driver 118 or the WLAN driver 120 so that the location information may be included in the identification block that is sent the location server 104.

The drivers and modules described above form one embodiment of the user device 102. However, in another embodiment, the user device 102 may also include an embedded location module 126 that may exist outside of the operating system 114 and the memory 110. This embodiment is distinct from the embodiments described above and highlighted by the dashed lines used to illustrate the embedded location module 126. For example, the embedded location module 126 may include its own processor (not shown) and memory (not shown) and may not need to rely on the processor 108 or memory 110. In one embodiment, the embedded location module 126 may be implemented as a distinct chip set and software that operates independently of the operating system 114. The embedded location module 126 may duplicate the functions of the location driver 118 described in the previous embodiment. In this way, the embedded location module 126 is isolated from the operating system 114 and the memory 110 to minimize the likelihood that the generation of the identification block is compromised by other applications stored in memory that may use the operating system 114 to infiltrate the network 106. For further protection, the embedded location module 126 may communicate directly with the network interface module 112 instead of using the WLAN driver 120. This additional isolation from the memory 110 provides additional protection against unauthorized applications residing in the memory 110. However, under certain conditions the embedded location module 126 may interact with the location driver 118 and pass information through the WLAN driver 120. For example, when the embedded location module 126 may not have access to positioning data (e.g., Global Positioning System) then interaction with location driver may be needed to obtain location information.

In one embodiment, the embedded location module 126 may generate the encryption keys used to encrypt the identifications block. The keys may be provided to the location server without accessing or using the operating system 114, memory 110, location driver 118, or WLAN driver 120. The embedded location module 126 may generate the identification block using the unique identifier described above, a Session ID, a permanent MAC address, time stamp, and/or a geographical location of the user device 102. In another embodiment, the embedded location module 126 may be directly coupled to the geo module 124 to prevent the location information from passing through the operating system 118 and/or the memory 110. After generating the identification block, the embedded location module 126 may append the identification block to one or more periodic messages being sent to the location server 104 via the network interface module 112. Accordingly, the location server 104 may validate the identity and/or location of the user device 102 as will be described in greater detail below.

The location server 104 may enforce and/or monitor security policy requirements determined by the network administrators. In one aspect, the location server 104 may validate the identity of the devices on the network 106. In another aspect, the location server may validate the location of the user devices 102 on the network 106. The location server 104 may implement these embodiments using hardware, software, or a combination thereof.

The location server 104 may include one or more processors 128, memory 130, and interface devices 132 to implement the aforementioned embodiments. The one or more processors 128 may individually comprise one or more cores and are configured to access and execute (at least in part) instructions stored in the one or more memories 130. The one or more memories 130 comprise one or more CRSMs as described above.

Similar to those described above, the one or more interfaces 132 allow for the coupling of devices such as displays, keyboards, storage devices, and so forth. Likewise, the one or more interfaces 132 may be configured to couple to the network 106.

The one or more memories 130 may store instructions for execution by the one or more processors 128 which perform certain actions or functions. These instructions may include an operating system 134 configured to manage hardware resources, such as the interfaces 132, and provide various services to applications executing on the one or more processors 128.

The memory 126 may also include an authentication module 132 and a location module 134 that may enforce and/or monitor security protocols on the network 106. In one embodiment, the authentication module 132 may receive the identification block from the user device 102. The identification block may be decrypted using the public group key provided by the user device 102. The decrypted information may include the unique identifier that is assigned to the user device 102. The authentication module may validate the unique identifier to determine the identity of the user device 102. In other embodiments, as noted above, the decrypted information may also include additional information that is associated with the user device 102 that provides additional evidence to support or disprove the identity of the user device 102. For example, the additional information may be a time stamp that has been associated with the user device. The time stamp may be an indication of when the identification block was created or when the user device 102 joined the network. These time stamp embodiments are merely examples and are not intended to limit the scope of the claims. The time stamp may be for any event or operation associated with the user device 102 or the location server 104. Additionally, in another embodiment, the decrypted information may include the geographical or physical location of the user device 102 as determined by the geo module 124.

The location module 138 may validate the location information provided by the geo module 124. The location module 138 may determine the location of the user device 102 using one or more access points (not shown) for the wireless portion of the network 106. For example, the location of the access points may be known and the location module 138 may be able to determine the location of the user device 102 based in part on signals strength or time of flight of the signals being sent from the user device 102 to the access points. In this way, the location module 138 may generate a scan list based on the location information gleaned from the access points and it may be compared against the positioning information generated by the geo module 124. Therefore, if the location information from the location module 138 and the geo module 124 are not the same or similar, then the location server may flag the user device 102 as unauthenticated. As a result, the user device 102 may not be able to access the network 106 or the location server 106 may request or wait for another identification block to confirm the location discrepancy.

Figure 2:
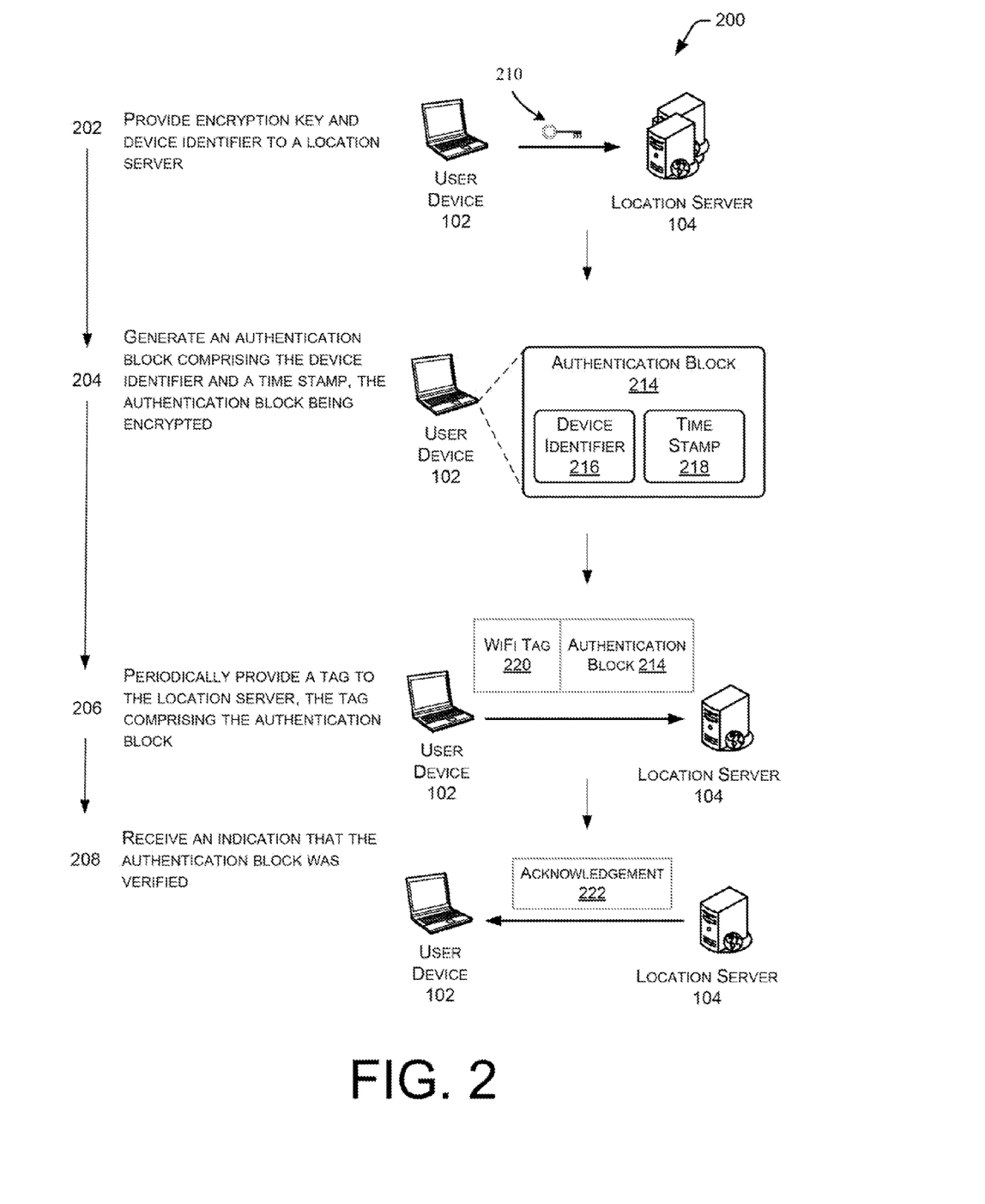
FIG. 2 is a flow diagram for authenticating a user device by attaching a block of encrypted and digitally signed data to unsecure messages sent over a wireless network in accordance with one or more embodiments of the disclosure.

FIG. 2 is a flow diagram 200 for authenticating a user device 102 by attaching a block of encrypted data to unsecure messages sent over a wireless network 106 to a location server 104.

At block 202, the user device 102 may provide the encryption key 210 to the location server 104. This may be accomplished via a secure sessions that is initiated by the user device 102 to securely transfer the encryption key. In another embodiment, the location server 104 may provide the encryption key 210 to the user device 102.

At block 204, the user device 102 may generate an identification or authentication block 214 comprising a device identifier 216 and/or a time stamp 218 in this embodiment. As noted above in FIG. 1, the authentication block 214 may include a variety of other information that may be used to increase the level of complexity to make it more difficult to compromise. Additionally, the authentication block 214 may also be encrypted using the encryption key 210. The information may include, but is not limited to, time stamps related to any operation or function performed by the user device 102 or provided by the location server 104. The information may also include scan lists provided by the location server 104 that indicate the location of the user device as determined by the location server based at least in part on signals received by the access points (not shown).

At block 206, the user device 102 may periodically provide a Wi-Fi tag 220 or message to the location server 104 during the normal course of operations. For example, the Wi-Fi tag 220 may be any message that is periodically transmitted over the wireless network 106 to comply with the 802.11 Wireless Communications Standard or any other standard or protocols that may send periodic messages over the wireless network during normal operations.

At block 208, the user device 102 may receive an indication that the authentication block 214 was validated or verified by the location server 104. In one embodiment, the location server 104 may send an acknowledgement message 222 indicating the authentication block 214 was used successfully to verify the identity of the user device 102. In another embodiment, the location server 104 may indicate acknowledgement by merely continuing to communicate normally with the user device 102 or to continue to provide network services to the user device 102.

Figure 3:
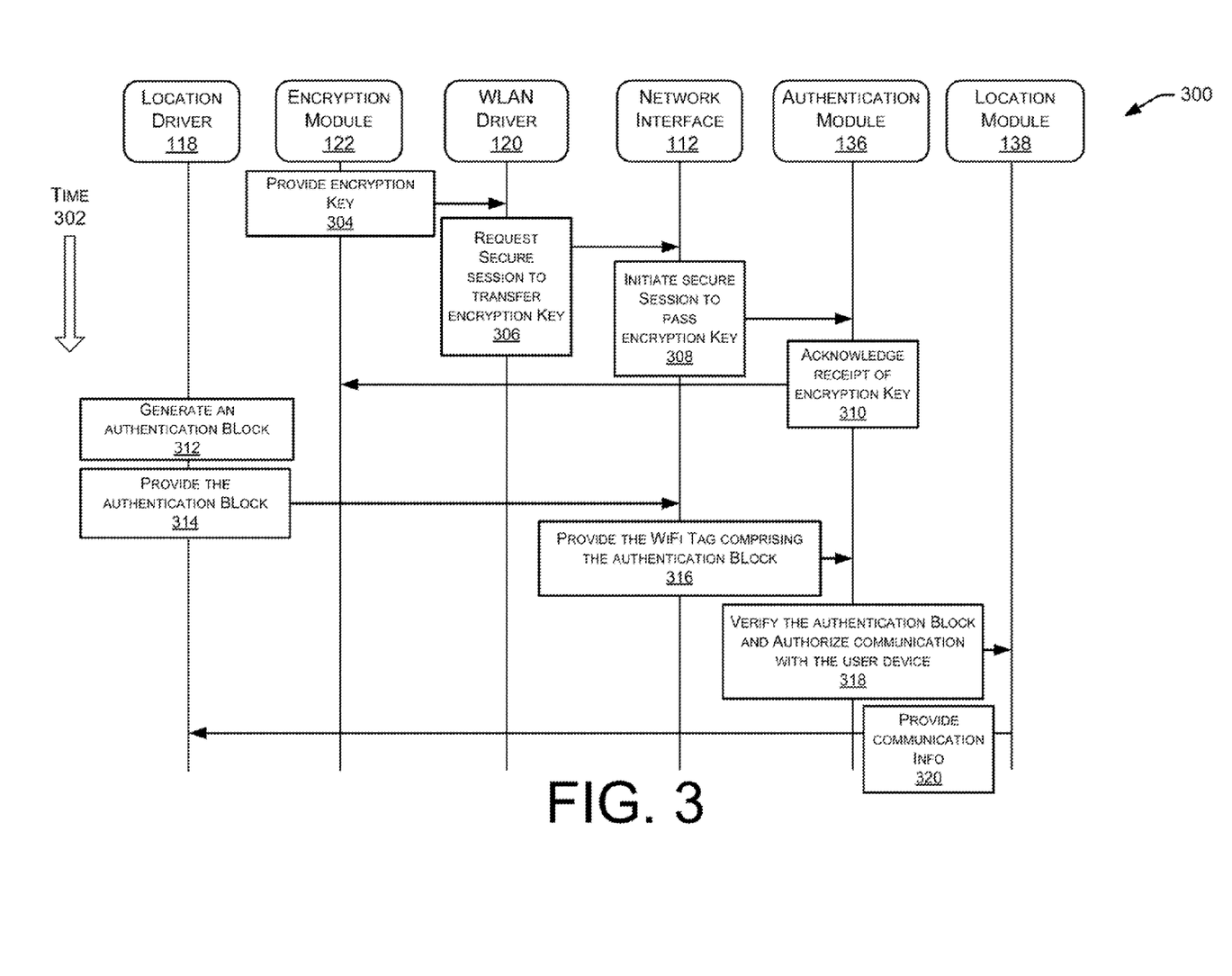
FIG. 3 is a flow diagram illustrating several interactions between various modules to implement the authentication of a user device in accordance with one or more embodiments of the disclosure.

FIG. 3 is a flow diagram 300 illustrating several interactions between various modules to implement the authentication of a user device 102 in conjunction with the location server 104. The flow diagram 300 shows a time axis 302 indicating the relative sequencing of these events for this embodiment. It should be noted that in other embodiments, the sequencing may be altered and some modules may be omitted. The description of FIG. 3 below is for one embodiment and additional embodiments that may use different steps and sequencing to authenticate the user device 102.

At block 304, the encryption module 122 may generate and provide the encryption key 210 to the WLAN driver 120.

At block 306, the WLAN driver 120 or the location driver 118 may request that the network interface module 112 initiate a secure session with the location server 104.

At block 308, the network interface module 112 may initiate the secure session with the authentication module 136 on the location server 104 and pass the encryption key on via the secure session.

At block 310, the authentication module 136 may acknowledge the receipt of the encryption key. In one embodiment, the acknowledgement may include encrypted data that the user device 102 may decrypt to determine if the encryption techniques are working as intended. The encrypted data may include a scan list that indicates the location of the user device 102 or a unique identifier assigned to the user device 102. Further, the user device 102 may also attach the scan list and/or the unique identifier to the authentication block 214 to support the identification of the user device 102.

At block 312, the location driver 102 may generate the authentication block 214 that may include the unique identifier 216 and/or time stamp 218. As noted above in FIG. 1, additional information may be included in the authentication block 214 to make it harder to comprise the security of the authentication block 214 by unauthorized users.

At block 314, the location driver 118 may provide the authentication block 214 to the network interface module 112. In another embodiment, the location driver 118 may provide the authentication block to the WLAN driver 120, which in turn, will provide the authentication block 214 to the network interface module 112.

At block 316, the network interface module 112 may append the authentication block 214 to an outgoing message 220 to the location server 104, as shown in FIG. 2. In another embodiment, the WLAN driver 120 may combine the message 220 and the authentication block 214 and provide it to the network interface module 112 for transmission to the location server 104.

At block 318, the authentication module 136 may extract the authentication block 214 from the message 220 and decrypt the authentication block using the encryption key 210. The authentication module 136 may verify the decrypted unique identifier and/or any other information included in the authentication block 214 is associated with the user device

102. The authentication module 136 may provide an indication of a successful authentication to the location module 138.

At block 320, the location module 138 may provide location information (e.g., scan list) based at least in part on receiving the indication of a successful authentication. In another embodiment, the location server 104 may acknowledge the successful authentication by continuing to communicate with the user device 102 after verifying the user device's 102 identity.

Figure 4:
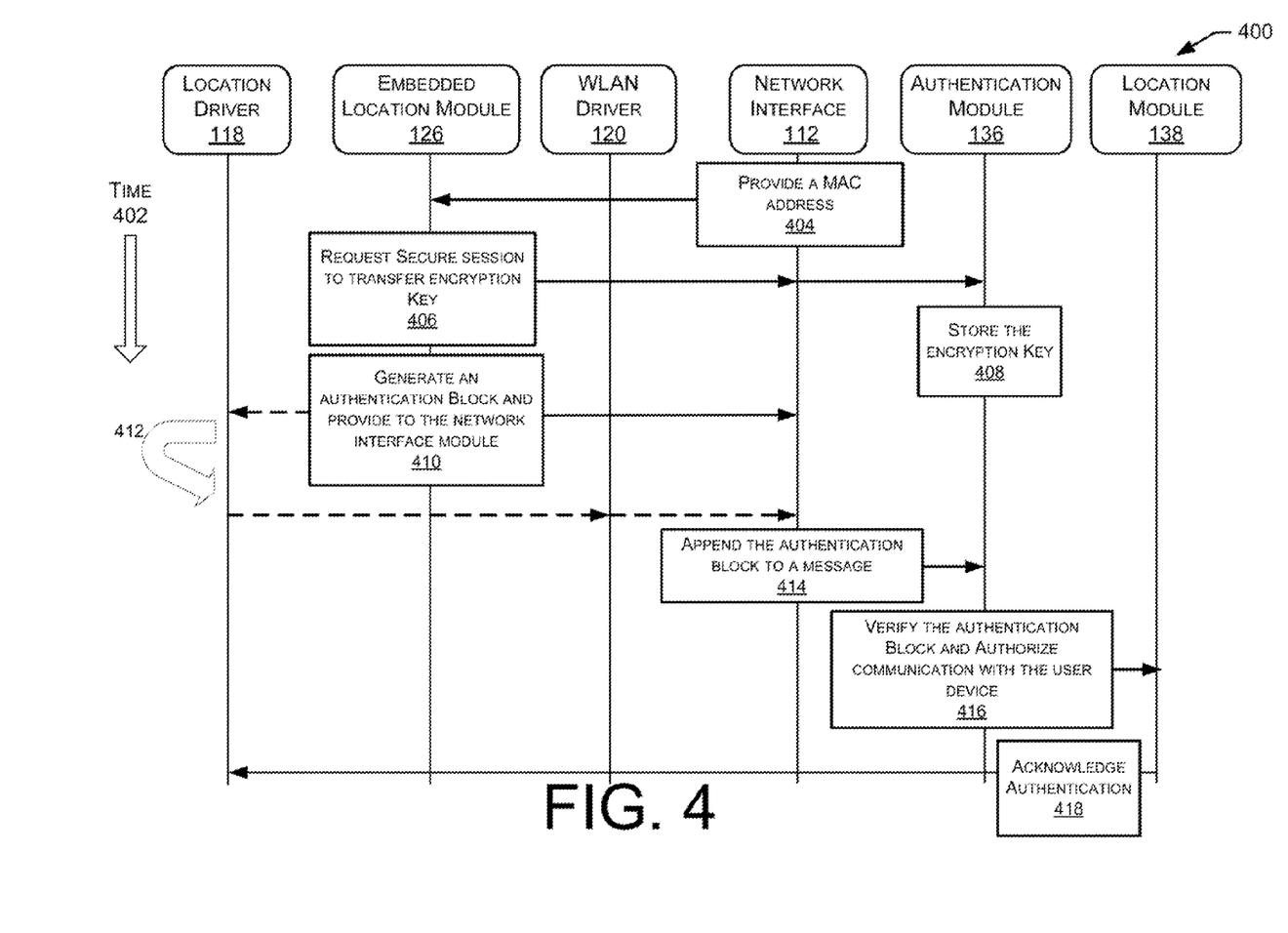
FIG. 4 is a flow diagram illustrating several interactions between various devices to implement the authentication of a user device in accordance with one or more embodiments of the disclosure.

FIG. 4 is a flow diagram 400 illustrating several interactions between various modules and the embedded location module 126 used to implement the authentication of a user device 102. The flow diagram 400 shows a time axis 402 indicating the relative sequencing of these events for this embodiment. It should be noted that in other embodiments, the sequencing may be altered and some modules may be omitted. The description of FIG. 4 below is for one embodiment and additional embodiments that may use different steps and sequencing to authenticate the user device 102.

At block 404, the network interface module 112 may provide a permanent MAC address to the embedded location module 126. In one embodiment, the MAC address may be used as the unique identifier or device identifier 216 for the authentication block 214.

At block 406, the embedded location module 406 may request that network interface module 112 (e.g., network stack) enable a secure session with the location server 104 and pass an encryption key to the location server 104 or the authentication module 136.

At block 408, the authentication module 136 may store the encryption key 210 in memory 130. The encryption key 210 may be used to decrypt any encrypted information provided by the user device 102 that is associated with the encryption key 210.

At block 410, in one embodiment, the embedded location module 126 may generate an authentication block 214 that includes encrypted information associated and/or unique to the user device 102.

At block 412, in another embodiment represented by the dashed lines, the embedded location module may generate the authentication block 214 and route the authentication block 214 through the location driver 118 and the WLAN driver 120 to the network interface module 112.

At block 414, the network interface module 112 may receive the authentication block 214 and attach the authentication block 214 to an outgoing message to that may be routed to the location server 104.

At block 416, the authentication module 136 may receive the message and extract the authentication block 214. The identity of the user device may be authenticated by decrypting the authentication block 214 and verifying the decrypted information is consistent with the information stored on the location server 104 that is associated with the user device 102. This may include an identifier, a time stamp, or any other type of fingerprint or signature information associated with the user device 102.

At block 418, the location module 138 may be informed of a successful user device 102 authentication and may provide an acknowledgement message to the user device 102. However, in another embodiment, the location server 104 may respond to a location request from the user device 102 if the authentication is successful. The response to the location request may include an access point scan list that includes a list of the access points that are receiving signals from the user device 102. Based on the strength and time of flight for the signals the location of the user device 102 may be determined relative to the locations of the access point.

In one embodiment, if the user device 102 is moved, the scan list may be altered enough to determine that the user device 102 has is no longer in the same location based on a comparison between scan lists compiled at different times. Accordingly, the location module 138 may determine that the location of the user device 102 has changed and if the location change is outside of where the user device 102 is expected to reside. If the user device is in an unexpected location, the location server 104 may terminate communications with the user device 102 and notify the network administrator. However, if the user device 102 is in an expected location, the location server 104 may respond to the scan list request or continue interacting with user device 102 as intended.

Figure 5:
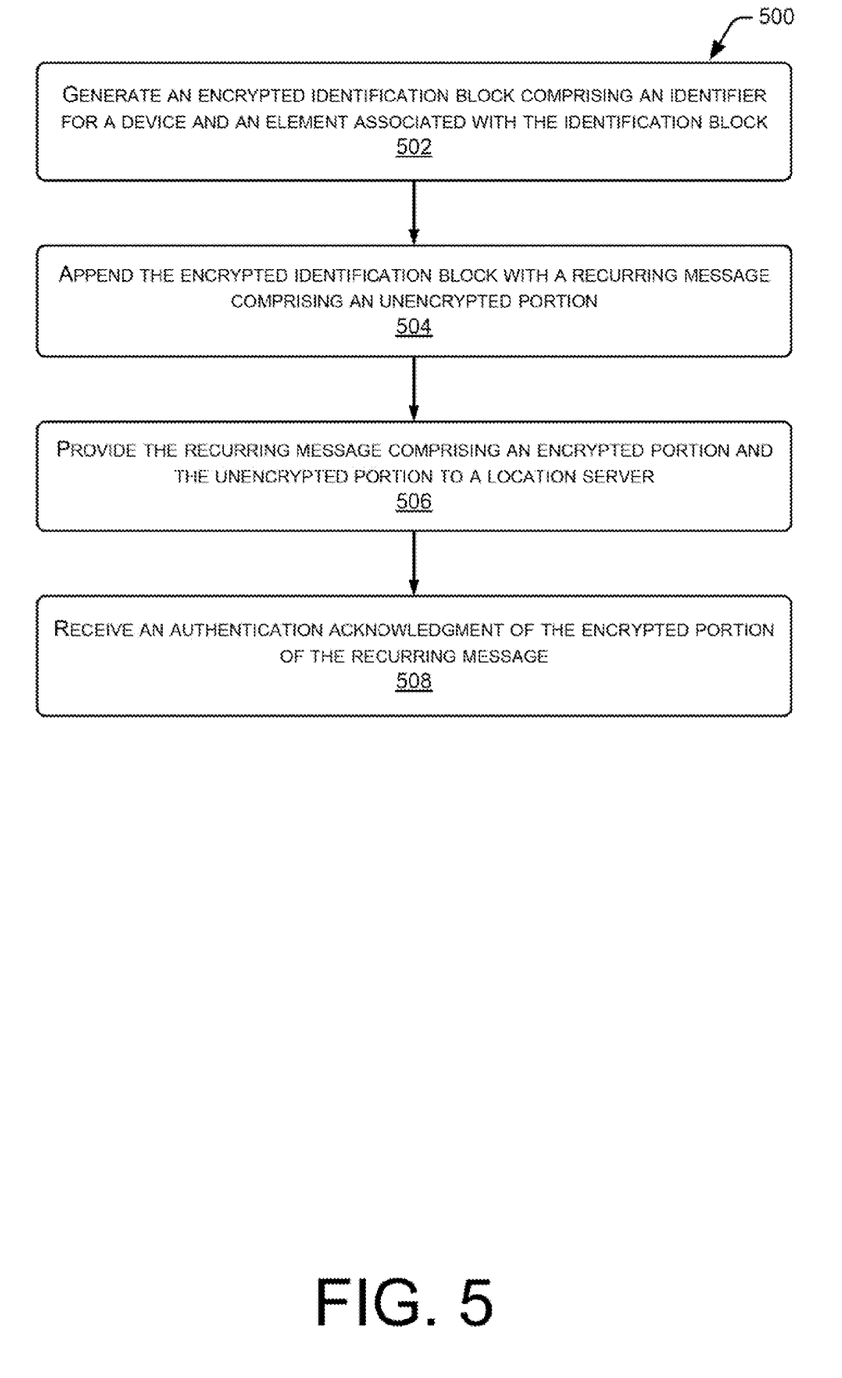
FIG. 5 is a flow diagram illustrating several interactions between various modules and the chip set used to implement the authentication of a user device in accordance with one or more embodiments of the disclosure.

FIG. 5 is a flow diagram 500 illustrating an exemplary method for authenticating a user device 102 with a location server 104 from the point of view from the user device 102.

At block 502, the user device 102 may generate an encrypted identification block that includes a device identifier and an element associated with the user device 102. The element may include a time stamp of when the identification block was encrypted or when the identification block was created prior to encryption.

At block 504, the user device 102 may append the encrypted identification block with a recurring message comprising an unencrypted portion. The recurring message may include any message that may be sent as part of complying with a communications standard, such as IEEE 802.11. The recurring message may be associated with a beacon message that a user device may transmit as part of maintaining a wireless connection with an access point in a wireless local area network.

At block 506, the recurring message may be provided to the wireless local area network. The recurring message may be routed from the access point to a network server that is monitoring the network traffic and may be enforcing security policies. In one embodiment, the network server may extract and decrypt the encrypted portion of the message to verify or authenticate the identity of the user device that sent the recurring message.

At block 508, the user device 102 may receive an authentication acknowledgement from the network server if the user device's 102 identity has been successfully authenticated. The acknowledgement may be in the form of a direct acknowledgement or the network server may continue to provide messages to the user device 102 that are consistent with normal operations of the wireless network.

Figure 6:
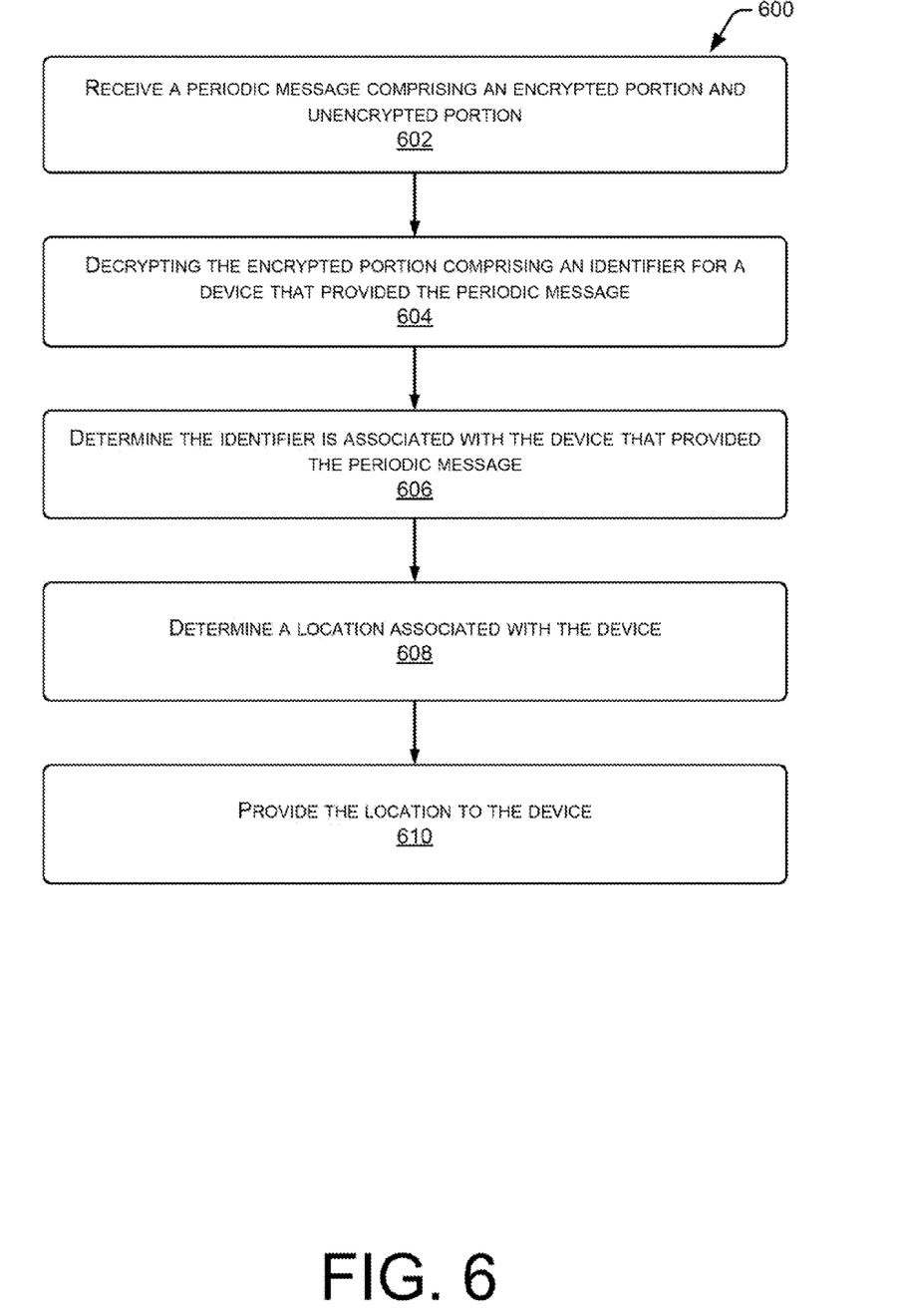
FIG. 6 is a flow diagram illustrating an exemplary method for authenticating a user device with a location server from the point of view from the user device in accordance with one or more embodiments of the disclosure.

FIG. 6 is a flow diagram 600 illustrating an exemplary method for authenticating a user device 102 with a location server 104 from the point of view from the location server 104.

At block 602, the location server 104 may receive a periodic message that includes an encrypted portion and an unencrypted portion. The encrypted portion may include the authentication block 214 and the unencrypted portion may be associated with a message provided by a user device 102 over a wireless network. The location server 104 may also receive a location request from the user device 102. In that, the location server may be able to determine the location of the user device 102 based at least in part on the signals received at one or more access points that receive signals from the user device 102.

At block 604, the location server 104 may decrypt the encrypted portion of the authentication message 214. The decrypted portion may include a unique identifier for the user device 102 that provided the recurring message.

At block 606, the location server 104 may determine if the identifier is associated with the user device 102 that provided the message. This may be done by comparing the decrypted identifier with an identifier stored on the location server 104 that is assigned to the user device 102. If the identifiers match, the then identity of the user device 102 is authenticated.

At block 608, in response to the location request, the location server 104 may determine the location user device 102 if the identity of the user device 102 has been authenticated. In another embodiment, if the user identity is not authenticated the location server 104 may discontinue communicating with the user device and may notify the network administrators that unauthorized access may have been attempted. The location server 104 may also report the difference in the expected location and the determined location to the network administrators.

At block 610, when the user device 102 identity is authenticated the location server 104 may not respond to the location request. The response may include a scan list that may indicate which access points detect the signals from the user device 102, the location of the access points, and/or the location of the user device 102 relative to the access points.

Conclusion

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions, which have been employed herein, are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A device comprising:
   one or more memory comprising an operating system that includes one or more processor-executable instructions;
   a processor to implement the operating system by executing the one or more computer executable instructions;
   a location driver module of the operating system to generate an authentication block comprising an identifier for the device and a time stamp;
   an encryption module to generate an encrypted authentication block; and
   a network interface module to incorporate the encrypted authentication block into an unencrypted periodic message provided to a wireless network.

2. The device of claim 1, further comprising an encryption key module to generate one or more encryption keys to encrypt the authentication block and provide the one or more encryption keys to a location server.

3. The device of claim 2, further comprising a wireless local area network driver of the operating system to establish a secure connection to the location server using the network interface module, the encryption key module uses the secure connection to provide the one or more encryption keys.

4. The device of claim 1, further comprising a geographic module to determine a location of the device, and the authentication block further comprising the location of the device.

5. The device of claim 1, wherein the periodic message comprises an unassociated tag packet.

6. The device of claim 1, wherein the time stamp comprises a time indicating when the authentication block was generated or encrypted.

7. A device comprising:
   one or more memory comprising an operating system that includes one or more processor-executable instructions;
   a processor to implement the operating system by executing the one or more processor-executable instructions;
   an embedded location module comprising a microcontroller and embedded memory to store processor-executable instructions that are executable on the microcontroller to generate an authentication block comprising an identifier for the device and a time stamp;
   an encryption module to generate an encrypted authentication block; and
   a network interface module to incorporate the encrypted authentication block into an unencrypted periodic message provided to a network.

8. The device of claim 7, further comprising a location driver module in the operating system to monitor location information provided by a location server.

9. The device of claim 7, wherein the embedded location module directly provides the authentication block the network interface module and a microcontroller that operates independently of the operating system.

10. The device of claim 7, further comprising an encryption key module to generate one or more encryption keys to encrypt the authentication block and provide the one or more encryption keys to a location server.

11. The device of claim 7, wherein the periodic message comprises an unassociated tag packet.

12. A method comprising:
   generating an encrypted identification block comprising an identifier for a device and an element associated with the identification block using a processor,
   appending the encrypted identification block with a recurring message comprising an unencrypted portion;
   providing the recurring message comprising an encrypted portion and the unencrypted portion to a location server using a wireless network interface device; and
   receiving an authentication acknowledgment of the encrypted portion of the recurring message at the device.

13. The method of claim 12, further comprising:
   requesting a secure session with the location server; and
   providing an encryption key to the location server via the secure session.

14. The method of claim 13, wherein the generating of the encrypted identification block is based at least in part on the encryption key.

15. The method of claim 12, further comprising determining a physical location of the device using geographic location determination component associated with the device.

16. The method of claim 15, wherein the identification block further comprises an indication of a physical or a geographical location of the device.

17. The method of claim 12, wherein the generating of the encrypted identification block is based in part on an operating system stored in memory on the device.

18. The method of claim 12, wherein the generating of the encrypted identification block is based at least in part on embedded component that operates independently of an operating system on the device.

19. The method of claim 12, wherein the recurring message comprises a message format at least one of the following formats: an Independent Basic Service Set format, a Wireless Distribution System format, or a Cisco Compatible Extensions format.

20. A method comprising:
   receiving a periodic message comprising an encrypted portion and an unencrypted portion;
   decrypting the encrypted portion comprising an identifier for a device that provided the periodic message using a processor;
   determining the identifier is associated with the device that provided the periodic message;
   determining a location associated with the device; and
   providing the location to the device using a wireless network interface device.

21. The method of claim 20, further comprising:
   receiving a request for a secure session with the device; and
   receiving an encryption key via the secure session.

22. The method of claim 20, wherein the encrypted portion further comprises a time stamp associated with the encrypted portion.

23. The method of claim 22, wherein the encrypted portion further comprises a geographical location of the device.

24. The method of claim 20, wherein the determining of the location is based at least in part on a scan list comprising one or more wireless network access points that are in proximity to the device, the scan list being provided by the device.

25. One or more tangible computer-readable storage media comprising computer-executable instructions operable to, when executed by at least one computer processor, enable the at least one computer processor to implement a method comprising:
   generating an encrypted identification block comprising an identifier for a device and an element associated with the identification block using a processor;
   appending the encrypted identification block with a recurring message comprising an unencrypted portion;
   providing the recurring message comprising an encrypted portion and the unencrypted portion to a location server using a wireless network interface device; and
   receiving an acknowledgment of the recurring message at the device.

26. The one or more tangible computer-readable storage media of claim 25, wherein the acknowledgment comprises any form of communication provided by a location server that received the recurring message.

27. The one or more tangible computer-readable storage media of claim 26, wherein the recurring message comprises any message that is provided to the location server on at least an intermittent basis.

28. One or more tangible computer-readable storage media comprising computer-executable instructions operable to, when executed by at least one computer processor, enable the at least one computer processor to implement a method comprising:
   receiving a periodic message comprising an secure portion and an unsecure portion;
   determining the secure portion comprises an identifier for a device that provided the periodic message using a processor;
   determining the identifier is associated with the device that provided the message;
   determining a location associated with the device; and
   providing the location to the device using a wireless network interface device.

29. The one or more tangible computer-readable storage media of claim 25, wherein the periodic message comprises any message sent from the device on a predetermined time interval.

* * * * *